United States Patent
Voruganti (10) Patent No.: US 7,680,668 B2
(45) Date of Patent: Mar. 16, 2010

(54) METHOD FOR GENERATING A LANGUAGE-INDEPENDENT REGRESSION TEST SCRIPT

(75) Inventor: Venkata Subbarao Voruganti, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1715 days.

(21) Appl. No.: 10/744,456

(22) Filed: Dec. 22, 2003

(65) Prior Publication Data

US 2005/0137844 A1 Jun. 23, 2005

(51) Int. Cl.
*G10L 21/00* (2006.01)

(52) U.S. Cl. .............................. 704/270.1; 704/8; 704/5

(58) Field of Classification Search ...................... 704/2, 704/5, 8, 9, 4, 1, 277, 270; 717/125, 106, 717/38, 26
See application file for complete search history.

(56) References Cited

U.S. PATENT DOCUMENTS

| | | | | |
|---|---|---|---|---|
| 5,678,039 A | * | 10/1997 | Hinks et al. | 707/4 |
| 6,530,039 B1 | * | 3/2003 | Yang | 714/38 |
| 7,103,875 B1 | * | 9/2006 | Kaneko et al. | 717/125 |

* cited by examiner

*Primary Examiner*—Huyen X. Vo
(74) *Attorney, Agent, or Firm*—Townsend and Townsend and Crew LLP (57) ABSTRACT

A computer-implemented method for generating a language-independent regression test script. A language-specific regression test script comprising at least one object is received, wherein the language-specific regression test script is for use by an automated testing tool for testing an application in a first language. A translatable string of the object is identified, wherein the translatable string is represented in the first language. The translatable string is replaced with a language-independent string that can be represented in a plurality of languages, generating a language-independent regression test script that can be used for testing internationalized applications.

27 Claims, 6 Drawing Sheets

Window1=("{class: window,label: \"Transaction Types\", mic_if_handles_windows: 1}");

410

Window1=("{class: window,label: \"!.*Transaction Types.*\", mic_if_handles_windows: 1}");

420

Window1=("{class: window,label: Transaction Types, mic_if_handles_windows: 1}");

430

Window1=("{class: window,label: tran_type, mic_if_handles_windows: 1}");

| 442 | 444 |
|---|---|
| var1 | string1 |
| var2 | string2 |
| var3 | string3 |

450

| 452 | 454 |
|---|---|
| tran_type | Transaction Type |
| file_type | File Type |
| query_ex | Query By Example |
| nav | Navigator |

METHOD FOR GENERATING A LANGUAGE-INDEPENDENT REGRESSION TEST SCRIPT

FIELD OF INVENTION

Embodiments of the present invention pertain to the field of automated testing tools. More particularly, the present invention relates to a method for generating pseudo-translated regression tests that are operable to run on pseudo-translated testing environments.

BACKGROUND OF THE INVENTION

In order to ensure the quality of software applications, quality assurance (QA) engineers use a variety of tools and procedures. For example, if an application has been modified, QA engineers test the application in order to ensure that additional bugs have not been introduced. Automated testing tools that perform regression testing are typically used to test the quality of a software application. WinRunner, by Mercury Interactive, is an example of an automated testing tool.

Regression testing is a quality control measure to ensure that any new addition or modification introduced into the application does not break the existing or desired functionality of the application. Regression testing is often used to selectively retest a software application that has been modified to ensure that all the known bugs have been fixed and that new bugs have not been introduced. Furthermore, regression testing can be used to ensure that no other previously working functions have failed as a result of the reparations and that newly added features are compatible with previous versions of the software. Thus regression testing is used for certifying any new application release, which contains new features and/or enhancements to the existing features with or without any changes to the entire technology stack on which the application resides.

Due to the global market for software applications, a particular software application may be internationalized (e.g., available in several languages). Therefore, it is typically necessary to test the application in each language in which it is available. Regression test scripts are used to test the quality of the software application. Typically, for each feature of the application that is being tested, a different regression test script must be recorded.

Due to the use of different labels and objects for versions of a software application for use in different languages, it is currently necessary to record a different regression test for each language. As a result, a regression test script for testing a particular feature in one language needs to be rerecorded for testing the same feature in a different language.

Depending on the complexity of the application being tested, a regression test script can take a long time for a QA engineer to create. Requiring QA engineers to create and maintain a regression test script for every feature of an application and for every language of the application that needs testing presents a number of disadvantages. For one, the work to create the test scripts and their associated GUI maps is often duplicated across several QA engineers, resulting in duplication of work and decreased productivity. Furthermore, maintaining a large number of regression test scripts is highly time consuming and further reduces productivity.

SUMMARY OF THE INVENTION

Accordingly, a need exists for a method to facilitate generating a language-independent regression test script for use in a plurality of testing environments. A need also exists for a method for facilitating automatic conversion of a language-specific regression test script into a language-independent regression test script. Furthermore, a need exists that satisfies the above needs while being cost-effective and easy to implement using currently available automated testing tools.

Various embodiments of the present invention, a computer-implemented method for generating a language-independent regression test script, are described herein. In one embodiment, a language-specific regression test script comprising at least one object is received, wherein the language-specific regression test script is for use by an automated testing tool for testing an application in a first language. In one embodiment, the first language is English. A translatable string of the object is identified, wherein the translatable string is represented in the first language. In one embodiment, the translatable string is a physical description of the object.

The translatable string is replaced with a language-independent string that can be represented in a plurality of languages, generating a language-independent regression test script that can be used for testing internationalized applications. In one embodiment, the plurality of languages comprises the first language and a second language.

In one embodiment, the first language is pseudo-translated language and the translatable string is comprised within a pseudo-translated string further comprising pseudo-translated padding. In one embodiment, a function of the automated testing tool is used to capture the translatable string of the pseudo-translated string. In one embodiment, the translatable string is replaced by placing a symbolic marker adjacent to at least one end of the translatable string.

In another embodiment, the language-independent string is a language-independent variable associated with a plurality of strings in a corresponding plurality of languages. In one embodiment, a plurality of data tables associated with the plurality of languages is generated, wherein the plurality of data tables comprise the plurality of strings. In one embodiment, the plurality of strings comprises translations of the translatable string in the corresponding plurality of languages.

In another embodiment, the present invention provides a method for testing an application using a language-independent regression test script. An execution language for use in executing the language-independent regression test script is identified. In one embodiment, information is received indicating a language of the plurality of languages as the execution language. In another embodiment, login information for a user is received. User preferences for the user are accessed based on the login information, the user preferences identifying a language of the plurality of languages as the execution language. In one embodiment, the execution language is English.

The language-independent regression test script is accessed, wherein the language-independent regression test script comprises at least one language-independent string that can be represented in a plurality of languages. In one embodiment, the plurality of languages comprises English and a second language. The language-independent regression test script is executed using the execution language such that the language-independent string is represented in the execution language.

In one embodiment, the language-independent string is a string comprised within a pseudo-translated string further comprising pseudo-translated padding, wherein the string is represented in a first language. In one embodiment, if the first language is identified as the execution language, the language-independent regression test script is executed using the string as the language-independent string. Alternatively, if a pseudo-translated language is identified as the execution language, the language-independent regression test script is executed using the pseudo-translated string as the language-independent string.

In another embodiment, the language-independent string is a language-independent variable associated with a plurality of strings in a corresponding plurality of languages. In one embodiment, a data table is accessed corresponding to the execution language, the data table comprising a string in the execution language for representing the language-independent string. The language-independent regression test script is executed using the string to represent the language-independent string.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Embodiments of the present invention provide methods for generating a language-independent regression test script for use by an automated testing tool. In one embodiment, the present invention provides a process for converting a regression test script comprising pseudo-translated strings into a language-independent regression test script. In another embodiment, the present invention provides a process for testing an application using a language-independent regression test script.

Notation and Nomenclature

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "identifying" or "replacing" or "using" or "generating" or "accessing" or "executing" or the like, may refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Figure 1:
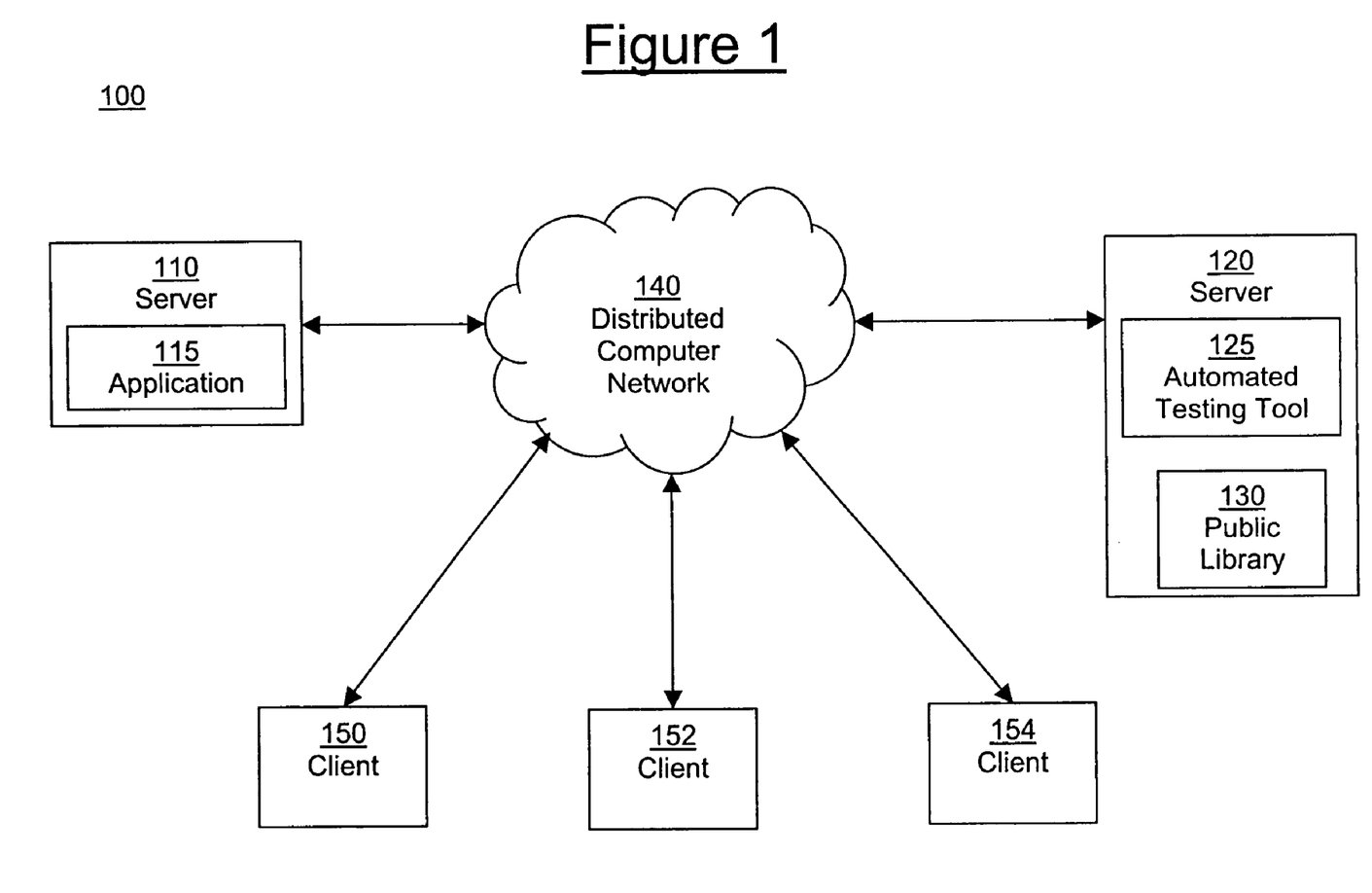
FIG. 1 illustrates a block diagram of an exemplary centralized environment upon which embodiments of the present invention may be implemented.

Exemplary Hardware upon Which Embodiments of the Present Invention may be Implemented FIG. 1 illustrates a block diagram of an exemplary centralized environment 100 upon which embodiments of the present invention may be implemented. As depicted in FIG. 1, centralized environment 100 includes two servers 110 and 120 communicatively coupled to clients 150, 152 and 154 via distributed computer network 140.

In one embodiment, application 115 is resident on server 110 and automated testing tool 125 is resident on server 120. Application 115 is a software application that is subject to quality assurance (QA) testing as performed by automated testing tool 125. Automated testing tool 125 is operable to run test scripts on application 115 for testing the quality of application 115. Public library 130 resident on server 120 comprises publicly available functions and regression test scripts. It should be appreciated that public library 130 may reside within a different server connected to distributed computer network 140.

In one embodiment, automated testing tool 125 and application 115 are accessed from client 150 over distributed computer network 140. A regression test script defining at least one regression test is run on application 115 through automated testing tool 125. In one embodiment, automated testing tool 125 comprises a driver for running a test script. The driver interacts with and executes application 115. In one embodiment, the regression test script is received at automated testing tool 125 from public library 130.

It should be noted that the embodiment of the present invention depicted in FIG. 1 (e.g., system 100) is implemented as a software based process cooperatively executing on the respective computer system platforms of servers 110 and 120 and clients 150, 152 and 154. The basic components of the computer system platforms are shown in the example computer system 200 of FIG. 2 below.

Referring still to FIG. 1, distributed computer network 140 includes well know network technologies. For example, distributed computer network 140 can be implemented using LAN technologies (e.g., Ethernet, Tokenring, etc.), the Internet, or other wired or wireless network technologies. The communications links between server 110, server 120, clients 150, 152 and 154, and distributed computer network 140 can be implemented using, for example, a telephone circuit, communications cable, optical cable, wireless link, or the like.

Figure 2:
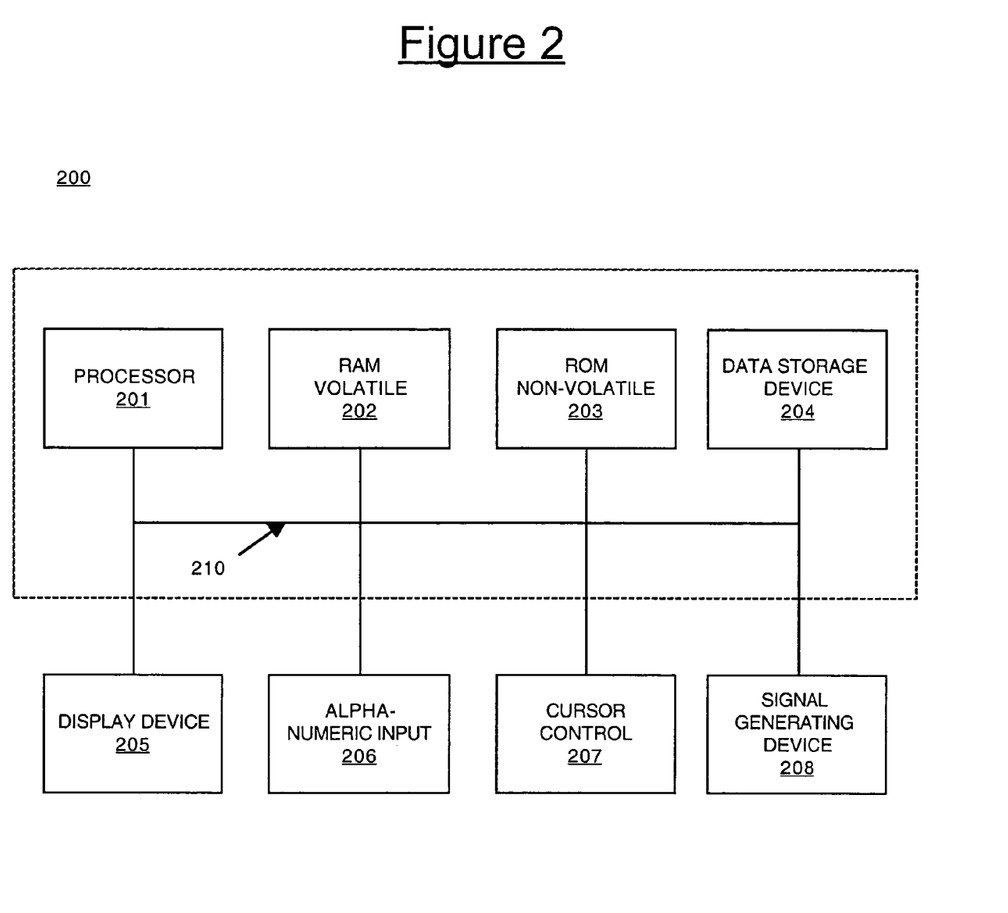
FIG. 2 illustrates a block diagram of an exemplary computer system upon which embodiments of the present invention may be implemented.

Other embodiments of the present invention may be implemented on a single computer system, such as computer system 200 of FIG. 2. In the present embodiment, the automated testing tool and the application are resident on the same computer system. It should be appreciated that embodiments of the present invention may be implemented on any number of servers and clients, and that the automated testing tool and the application to be tested can reside on the same computer system or on separate computer systems.

FIG. 2 illustrates a block diagram of an exemplary computer system 200 upon which embodiments of the present invention may be implemented. Portions of the present invention are comprised of computer-readable and computer executable instructions which reside, for example, in computer-usable media of computer system 200. Computer system 200 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 200) and are executed by the processor(s) of system 200. When executed, the instructions cause the computer system 200 to implement the functionality of the present invention as described above.

In general, computer system 200 shows the basic components of a computer system used to implement "server" machines and "client" machines. Computer system 200 comprises an address/data bus 210 for communicating information, one or more central processors 201 coupled with the bus 210 for processing information and instructions, a computer readable volatile memory unit 202 (e.g., random access memory, static RAM, dynamic, RAM, etc.) coupled with the bus 210 for storing information and instructions for the central processor(s) 201, a computer readable non-volatile memory unit 203 (e.g., read only memory, programmable ROM, flash memory, EPROM, EEPROM, etc.) coupled with the bus 210 for storing static information and instructions for the processor(s) 201. System 200 also includes a computer readable data storage device 204 such as a magnetic or optical disk and disk drive coupled with the bus 210 for storing information and instructions. Optionally, system 200 can include a display device 205 coupled to the bus 210 for displaying information to the computer user, an alphanumeric input device 206 including alphanumeric and function keys coupled to the bus 210 for communicating information and command selections to the central processor(s) 201, a cursor control device 207 coupled to the bus for communicating user input information and command selections to the central processor(s) 201, and a signal generating device 208 coupled to the bus 210 for communicating command selections to the processor(s) 201.

A Method for Generating a Language-Independent Regression Test Script

Figure 3:
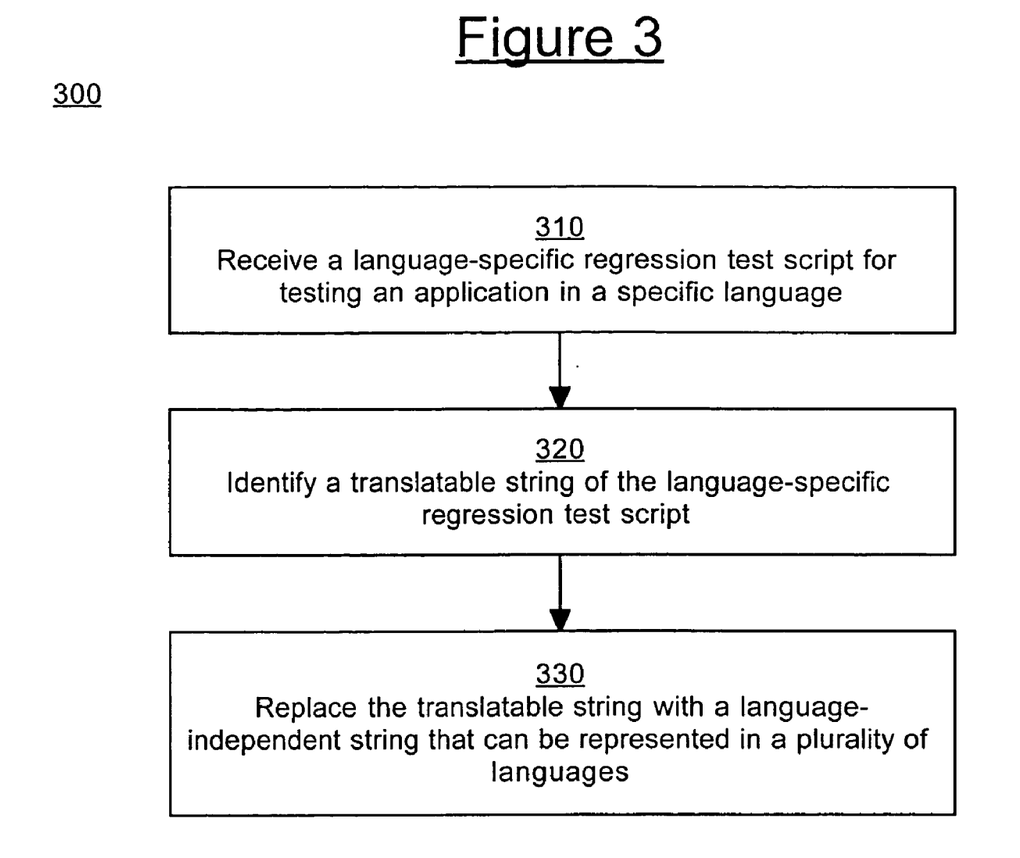
FIG. 3 illustrates a flowchart showing steps in a computer-implemented process of generating a language-independent regression test script in accordance with one embodiment of the present invention.

FIG. 3 illustrates a flowchart showing steps in a computer-implemented process 300 for generating a language-independent regression test script in accordance with one embodiment of the present invention. In one embodiment, process 300 is carried out by processors and electrical components (e.g., computer system 200 of FIG. 2) under the control of computer readable and computer executable instructions. Although specific steps are disclosed in process 300, such steps are exemplary. That is, the embodiments of the present invention are well suited to performing various other steps or variations of the steps recited in FIG. 3.

At step 310 of FIG. 3, a language-specific regression test script is received for testing an application in a specific language. In one embodiment, the language-specific regression test comprises at least one object, such as a program window or query box of the graphical user interface (GUI) of the application being tested. An object typically has an associated physical description, such as a textual label or a window name that is used for identifying the object. The language-specific regression test script is written for use by an automated testing tool for testing an application in a specific language (e.g., objects are encoded in a specific language). In one embodiment, the language-specific regression test is used for testing an application in English. It should be appreciated that the language-specific regression test may be used for testing an application in any language (e.g., Korean and Arabic), and is not intended to be limited to English.

An automated testing tool is operable to implement regression test scripts (e.g., regression tests) to test the quality of a software application. In one embodiment, the automated testing tool is operable to record regression test scripts. An automated testing tool comprises a driver for running functions and test scripts associated with the QA testing.

In one embodiment, the language-specific regression test script is for testing an application using pseudo-translated language. Pseudo-translated language has been designed using various unique features of most of foreign languages in which internationalized software applications are released. Pseudo-translated language typically contains all types of multi-byte characters. In one embodiment, pseudo-translated language utilizes UTF8 Unicode. The typical characteristics of the foreign languages are mimicked into the pseudo-translated language, using single byte characters (e.g., English), two byte characters (e.g., Theta symbol—Ø) and three byte characters (e.g., Omega symbol—Ω) and various other special characters, such as a single quote (') or an asterisk (*). Pseudo-translated language is essentially another language, which in one embodiment has original English strings padded on either side by special multi-byte characters and symbols. It should be appreciated that in other embodiments of the invention, language-independent variable may utilize original strings written in any language (e.g., French, Korean, or Japanese) with or without padding on either side by special multi-byte characters and symbols, accessing original strings from the corresponding language-specific data-table.

At step 320, a translatable string of the language-specific regression test script is identified. The translatable string is represented in the specific language being tested as identified by the language-specific regression test script. In one embodiment, the translatable string is one of the attributes (e.g., name, label) of an object (e.g., window, button) of a screen or form involved in the language-specific regression test script using an external temporary or permanent GUI map. In another embodiment, the translatable string is represented as a string or represented through a language-independent variable within the physical description of an object (e.g., window, button) involved in the language-specific regression test script without requiring the use of an external temporary or permanent GUI map. In another embodiment, objects (e.g., window, button), involved in the regression test, are represented by language independent names (e.g., 'Developer-names'), which are used to identify objects in the application without requiring dependency on any specific language displayed to the user as user-interface by the application code.

In one embodiment, where the language being tested is pseudo-translated language, the translatable string is comprised within a pseudo-translated string further comprising pseudo-translated padding. As described above, a language-independent variable may represent strings written in any language with or without padding on either side by special multi-byte characters and symbols. In one embodiment, a custom function of the automated testing tool is used to identify objects (e.g. window, button) irrespective of the language of the application. In one embodiment, a function of the testing tool is used to identify the translatable string and to automatically replace it with a string, either in the regression test script or in the external GUI map as desired and specified by the user.

Figure 4A:
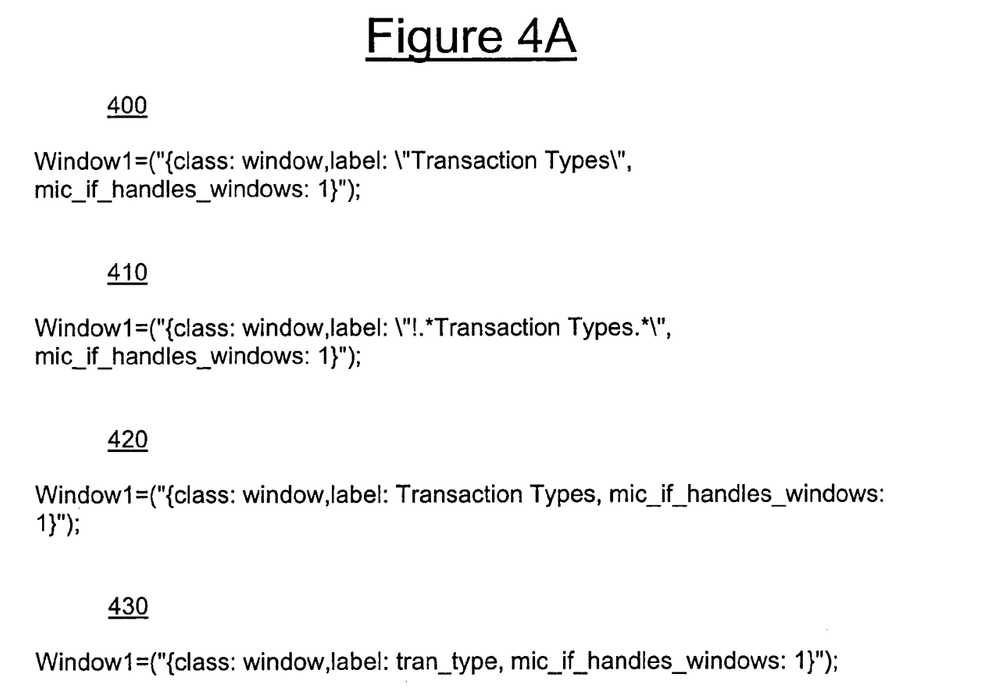
FIG. 4A illustrates exemplary Test Script Language (TSL) program code in accordance with embodiments of the invention.

At step 330, the translatable string is replaced with a language-independent variable that can be represented in a plurality of languages. In one embodiment, where the language being tested is pseudo-translated language, the translatable string is enclosed within a symbolic marker. For example, Test Script Language (TSL) program code 400 of FIG. 4A illustrates an example of a physical description "Transaction Types" represented in pseudo-translated language. The symbolic marker "!.*" is placed at the beginning of the English string after the padding and the symbolic marker ".*" is placed at the end of the English string before the padding to identify it as a language-independent string "!.*Transaction Types.*", as shown at TSL program code 410 of FIG. 4A. It should be appreciated that TSL program code uses the symbols "." and "*" to wild card or represent any symbol or combination of symbols or characters or character of any language.

In another embodiment, the language-independent string is a language-independent variable associated with a plurality of strings in a corresponding plurality of languages. In one embodiment, the plurality of strings comprises translations of the translatable string in the corresponding plurality of languages. For example, TSL program code 420 of FIG. 4A illustrates an example of a physical description (e.g., "Trans-action Types") represented in English. The physical description "Transaction Types" is replaced with the language-independent variable "tran_types", as shown at TSL program code 430 of FIG. 4A.

In one embodiment, a plurality of data tables associated with the plurality of languages are generated, wherein the plurality of data tables comprise the plurality of strings. Each data table comprises the necessary strings for executing a regression test script in a particular language. For example, prior to execution of a regression test script, an execution language is identified. During execution of a regression test script, a language-independent variable is invoked. The data table corresponding to the execution language is accessed, and the string associated with the language-independent variable is used in completing execution of the regression test script.

Figure 4B:
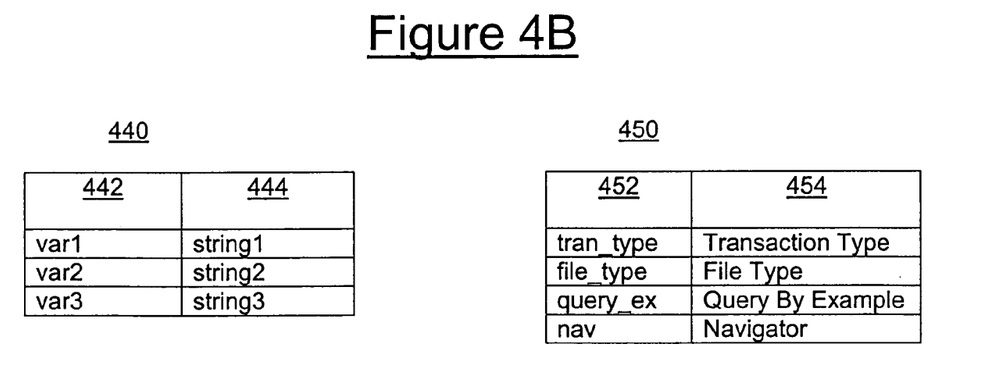
FIG. 4B illustrates exemplary data tables in accordance with embodiments of the invention.

FIG. 4B illustrates exemplary data tables in accordance with embodiments of the invention. Exemplary data table 440 comprises a plurality of language-independent variables 442 and their corresponding strings 444. For example, var1 is associated with string1, such that if var1 is invoked, string1 is used for execution of the regression test script. Exemplary data table 450 illustrates an English data table, comprising language-independent variables 452 and their corresponding English strings 454. For example, the language-independent variable "tran_types" is associated with the English string "Transaction Types", such that if "tran_types" is invoked, "Transaction Types" is used for execution of the regression test script.

Embodiments of the present invention provide a method for generating regression test scripts that can be executed in any language. In one embodiment, a regression test script can be generated that allows for execution in both the English and the Pseudo-translated environments using same set of functions and GUImaps and regression test scripts. Accordingly, the present invention provides for wider applicability of regression test scripts, thereby decreasing the time required to record regression test scripts for use in testing internationalized applications.

FIGS. 5A, 5B, 6A and 6B illustrates flowcharts of processes 500, 540, 600 and 650, respectively, in accordance with embodiments of the present invention. In one embodiment, processes 500, 540, 600 and 650 are carried out by processors and electrical components (e.g., computer system 200 of FIG. 2) under the control of computer readable and computer executable instructions. Although specific steps are disclosed in processes 500, 540, 600 and 650, such steps are exemplary. That is, the embodiments of the present invention are well suited to performing various other steps or variations of the steps recited in FIGS. 5A, 5B, 6A and 6B.

Figure 5A:
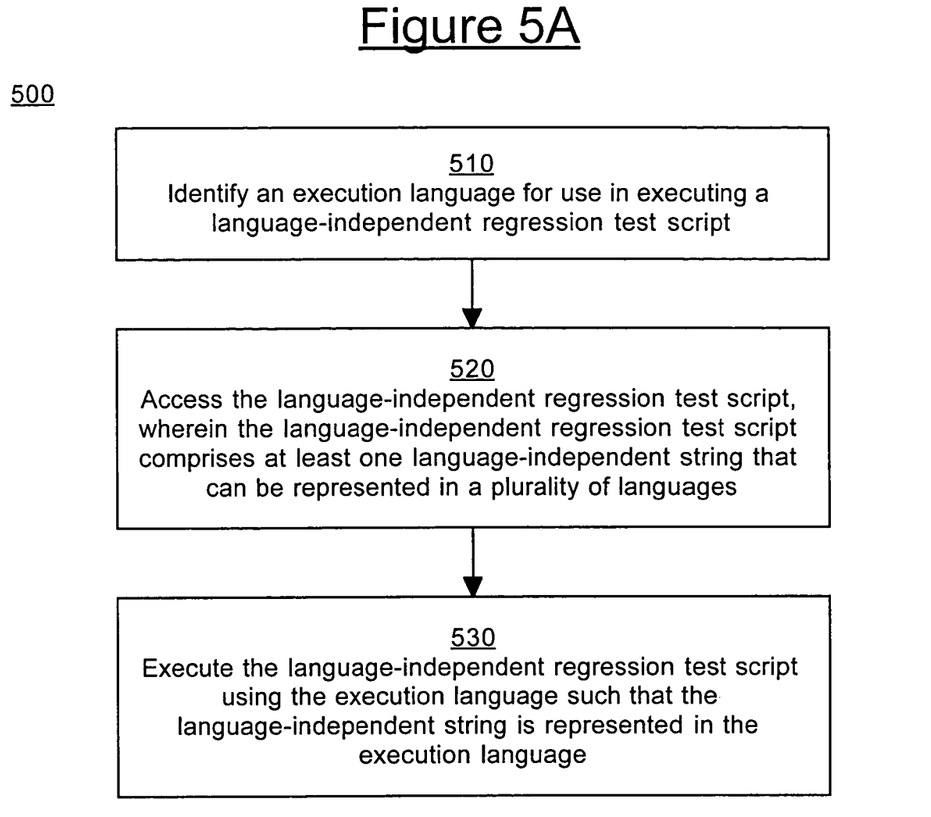
FIG. 5A illustrates a flowchart showing steps in a process of using a language-independent regression test script in accordance with one embodiment of the present invention.

FIG. 5A illustrates a flowchart showing steps in a process 500 for testing an application using a language-independent regression test script in accordance with one embodiment of the present invention. At step 510, an execution language for use in executing the language-independent regression test script is identified. As described above, a language-independent regression test script can be executed in a plurality of languages. In one embodiment, the execution language is identified by receiving information indicating a language of the plurality of languages as the execution language.

Figure 5B:
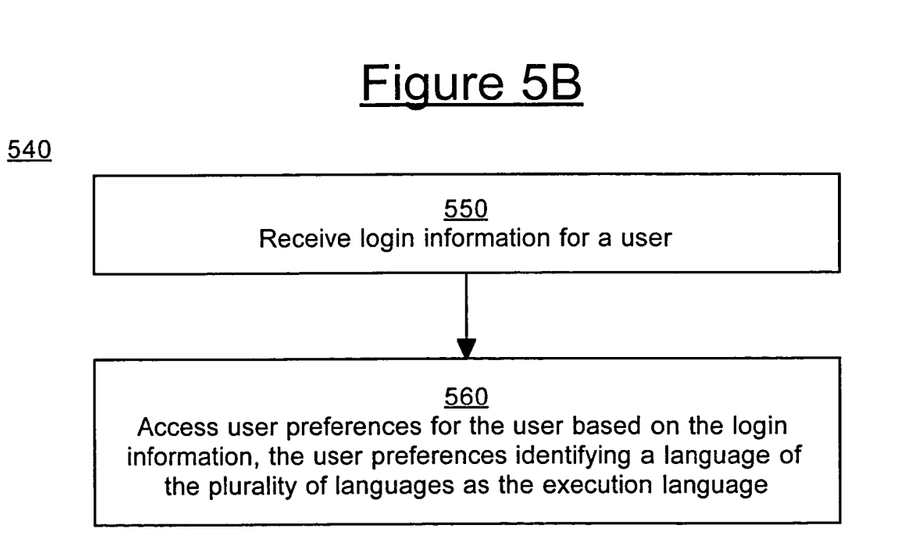
FIG. 5B illustrates a flowchart showing steps in a process of identifying an execution language in accordance with one embodiment of the present invention.

In another embodiment, the execution language is identified based on the identity of a user. FIG. 5B illustrates a flowchart showing steps in a process 540 for identifying an execution language in accordance with one embodiment of the present invention. At step 550, login information for a user is received. The login information is used to identify a user. In one embodiment, the login information is received at a client device (e.g., client 150 of FIG. 1) and communicated over a distributed computer network (e.g., distributed computer network 140 of FIG. 1) for identifying the user.

At step 560 of FIG. 5B, user preferences for the user are accessed based on the login information. In one embodiment, the user preferences identify a language of the plurality of languages as the execution language. The user preferences may be preconfigured by the user to identify a language in which to execute applications. For example, if the user is a native English speaker, English may be identified as the execution language. In another embodiment, the user preferences are preconfigured to a default execution language, such as the primary language of the country in which the user is located.

With reference to FIG. 5A, at step 520, the language-independent regression test script is accessed, wherein the language-independent regression test script comprises at least one language-independent string that can be represented in a plurality of languages. In one embodiment, the language-independent string is a string comprised within a pseudo-translated string further comprising pseudo-translated padding. As described above, the string is enclosed within a symbolic marker.

In another embodiment, the language-independent string is a language-independent variable associated with a plurality of strings in a corresponding plurality of languages. In one embodiment, the plurality of strings comprises translations of the translatable string in the corresponding plurality of languages.

At step 530, the language-independent regression test script is executed using the execution language such that the language-independent string is represented in the execution language. Execution of the language-independent regression test script differs according to whether the language-independent regression test script comprises a pseudo-translated string, as shown in process 600 of FIG. 6A, or whether the language-independent regression test script comprises a language-independent variable, as shown in process 650 of FIG. 6B.

Figure 6A:
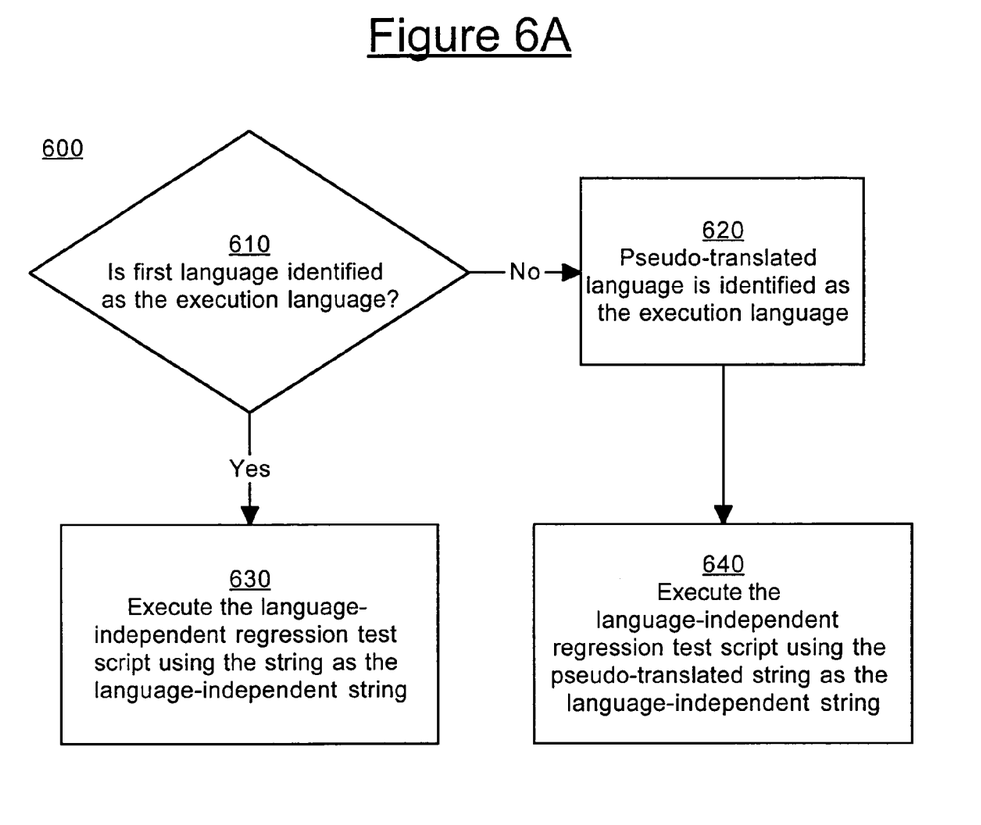
FIG. 6A illustrates a flowchart showing steps in a process of executing a language-independent regression test script comprising a pseudo-translated string in accordance with one embodiment of the present invention.

FIG. 6A illustrates a flowchart showing steps in a process 600 of executing a language-independent regression test script comprising a pseudo-translated string in accordance with one embodiment of the present invention. At step 610 of process 600, it is determined whether the first language is identified as the execution language. The first language is the language in which the string of the pseudo-translated string is represented. If the first language is identified as the execution language, process 600 proceeds to step 630. At step 630, the language-independent regression test script is executed using the string as the language-independent string.

At step 620, if the first language is not identified as the execution language, pseudo-translated language is identified as the execution language, and process 600 proceeds to step 640. At step 640, the language-independent regression test script is executed using the pseudo-translated string as the language-independent string.

Figure 6B:
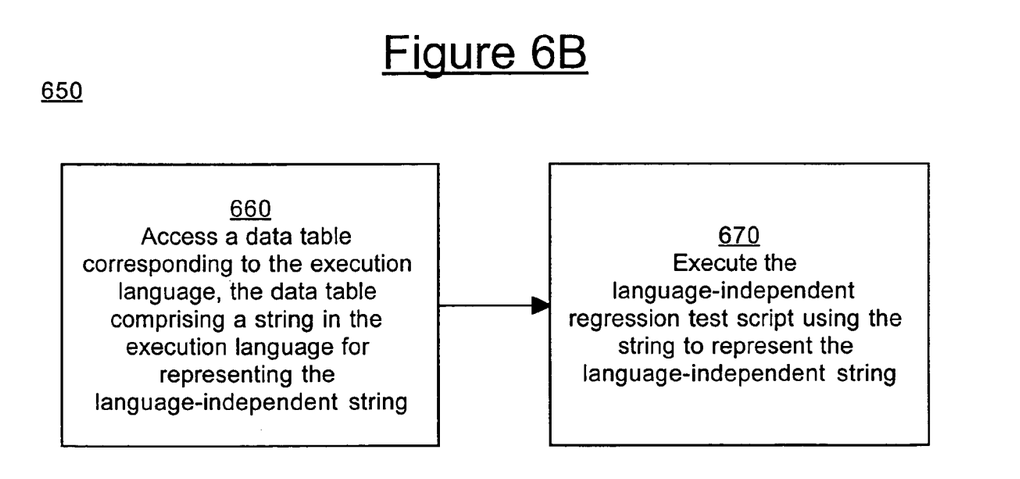
FIG. 6B illustrates a flowchart showing steps in a process of executing a language-independent regression test script comprising a language-independent variable in accordance with one embodiment of the present invention.

FIG. 6B illustrates a flowchart showing steps in a process 650 of executing a language-independent regression test script comprising a language-independent variable in accordance with one embodiment of the present invention. At step 660, a data table corresponding to the execution language is accessed, wherein the data table comprises a string in the execution language for representing the language-independent string. At step 670, the language-independent regression test script is executed using the string to represent the language-independent string.

Embodiments of the present invention provide for easily generating a language-independent regression test script for use by an automated testing tool. A language-independent regression test script may be made available at a central location in the form of a library and can be made sharable by the entire user community, allowing for testing of software applications by different users in different execution languages. Furthermore, if any change is required to the language-independent regression test script, it needs to be done only once in the central library.

Various embodiments of the present invention, a method for generating language-independent regression test scripts, are thus described. While the present invention has been described in particular embodiments, it should be appreciated that the present invention should not be construed as limited by such embodiments, but rather construed according to the below claims.

What is claimed is:

1. A computer-implemented method for generating a language-independent regression test script, said method comprising:

receiving, by a computer system, a language-specific regression test script for an application, said language-specific regression test script comprising at least one object and configured for use by an automated testing tool operable to interact with and execute the application according to said language-specific regression test script;

identifying, by the computer system, a translatable string of said object, wherein said translatable string is represented in a first language; and replacing, by the computer system, said translatable string with a language-independent variable associated with a plurality of strings in a corresponding plurality of languages.

2. The method as recited in claim 1 wherein said first language is pseudo-translated language and wherein said translatable string is comprised within a pseudo-translated string further comprising pseudo-translated padding.

3. The method as recited in claim 2 further comprising identifying, by said automated testing tool, said translatable string within said pseudo-translated string.

4. The method as recited in claim 2 wherein said replacing said translatable string comprises placing a symbolic marker adjacent to at least one end of said translatable string.

5. The method as recited in claim 1 wherein said plurality of strings comprise translations of said translatable string in said corresponding plurality of languages.

6. The method as recited in claim 1 wherein said translatable string is a physical description of said object.

7. The method as recited in claim 1 wherein said first language is English.

8. The method as recited in claim 1 further comprising generating, by the computer system, a plurality of data tables associated with said plurality of languages, said plurality of data tables comprising said plurality of strings.

9. The method as recited in claim 1 wherein said plurality of languages comprises said first language and a second language.

10. The method of claim 1, further comprising generating, by the computer system, said language-independent regression test script, said language-independent regression test script including said language-independent variable and executable by said automated testing tool.

11. The method of claim 10, further comprising utilizing, by said computer system, said automated testing tool to perform a regression test of the application according to said language-independent test script.

12. The method of claim 1, wherein said language-specific regression test script is embodied in a scripting language.

13. The method of claim 12, wherein said scripting language is Test Script Language.

14. A computer-usable storage medium having computer-readable program code embodied therein for causing a computer system to perform a method for generating a language-independent regression test script, said method comprising:
receiving a language-specific regression test script for an application, said language-specific regression test script comprising at least one object and configured for use by an automated testing tool operable to interact with and execute the application according to said language-specific-regression test script;
identifying a translatable string of said object, wherein said translatable string is represented in a first language; and
replacing said translatable string with a language-independent variable associated with a plurality of strings in a corresponding plurality of languages.

15. The computer-usable storage medium as recited in claim 14 wherein said first language is pseudo-translated language and wherein said translatable string is comprised within a pseudo-translated string further comprising pseudo-translated padding.

16. The computer-usable storage medium as recited in claim 15 wherein the method further comprises using a function of said automated testing tool to identify said translatable string within said pseudo-translated string.

17. The computer-usable storage medium as recited in claim 16 wherein the method further comprises automatically replacing said translatable string with a second string.

18. The computer-usable storage medium as recited in claim 15 wherein said replacing said translatable string comprises placing a symbolic marker adjacent to at least one end of said translatable string.

19. The computer-usable storage medium as recited in claim 14 wherein said plurality of strings comprise translations of said translatable string in said corresponding plurality of languages.

20. The computer-usable storage medium as recited in claim 14 wherein said translatable string is a physical description of said object.

21. The computer-usable storage medium as recited in claim 14 wherein said first language is English.

22. The computer-usable storage medium as recited in claim 14 further comprising generating a plurality of data tables associated with said plurality of languages, said plurality of data tables comprising said plurality of strings.

23. The computer-usable storage medium as recited in claim 14 wherein said plurality of languages comprises said first language and a second language.

24. The computer-usable storage medium of claim 14, wherein the method further comprises generating, by the computer system, said language-independent regression test script, said language-independent regression test script including said language-independent variable and executable by said automated testing tool.

25. The computer-usable storage medium of claim 24, wherein the method further comprises utilizing, by said computer system, said automated testing tool to perform a regression test of the application according said language-independent test script.

26. The computer-usable storage medium of claim 14, wherein said language-specific regression test script is embodied in a scripting language.

27. The computer-usable storage medium of claim 26, wherein said scripting language is Test Script Language.

* * * * *

UNITED STATES PATENT AND TRADEMARK OFFICE
CERTIFICATE OF CORRECTION

| | | |
|---|---|---|
| PATENT NO. | : 7,680,668 B2 | Page 1 of 1 |
| APPLICATION NO. | : 10/744456 | |
| DATED | : March 16, 2010 | |
| INVENTOR(S) | : Venkata Subbarao Voruganti | |

It is certified that error appears in the above-identified patent and that said Letters Patent is hereby corrected as shown below:

In column 12, line 28, in claim 25, delete "according" and insert -- according to --, therefor.

Signed and Sealed this

Fourteenth Day of September, 2010

David J. Kappos
*Director of the United States Patent and Trademark Office*